United States Patent
Bisceglia et al.

(10) Patent No.: US 9,233,649 B2
(45) Date of Patent: Jan. 12, 2016

(54) SUPPORT AND RETENTION ASSEMBLY FOR A PORTABLE ELECTRONIC DEVICE, AND DASHBOARD PROVIDED WITH SUCH A SUPPORT AND RETENTION ASSEMBLY

(71) Applicant: Fiat Group Automobiles S.p.A., Turin (IT)

(72) Inventors: Gennaro Bisceglia, Turin (IT); Paolo Ceccato, Turin (IT); Luca Marengo, Turin (IT)

(73) Assignee: Fiat Group Automobiles S.p.A., Turin (IT)

( * ) Notice: Subject to any disclaimer, the term of this patent is extended or adjusted under 35 U.S.C. 154(b) by 5 days.

(21) Appl. No.: 14/293,796

(22) Filed: Jun. 2, 2014

(65) Prior Publication Data

US 2014/0354002 A1 Dec. 4, 2014

(30) Foreign Application Priority Data

Jun. 3, 2013 (IT) .............................. TO2013A0453

(51) Int. Cl.
| | |
|---|---|
| *B60R 11/02* | (2006.01) |
| *B60K 37/04* | (2006.01) |
| *B60K 37/06* | (2006.01) |
| *H04M 1/04* | (2006.01) |
| *B60R 11/00* | (2006.01) |

(52) U.S. Cl.
CPC ................. *B60R 11/02* (2013.01); *B60K 37/04* (2013.01); *B60K 37/06* (2013.01); *H04M 1/04* (2013.01); *B60K 2350/00* (2013.01); *B60K 2350/1068* (2013.01); *B60K 2350/405* (2013.01); *B60K 2350/941* (2013.01); *B60K 2350/946* (2013.01); *B60R 2011/0005* (2013.01); *B60R 2011/0071* (2013.01); *B60R 2011/0075* (2013.01); *B60R 2011/0082* (2013.01); *B60R 2011/0087* (2013.01)

(58) Field of Classification Search
CPC ............ B60R 2011/0005; B60R 11/02; B60R 11/0241; B60R 2011/0071; B60R 2011/0082; B60R 2011/0087; B60K 37/04; B60K 37/06; B60K 2350/1068; B60K 2350/405; B60K 2350/00; B60K 2350/941; B60K 2350/946; H04M 1/04
USPC ................................................ 296/70, 37.12
See application file for complete search history.

(56) References Cited

U.S. PATENT DOCUMENTS

| | | | | |
|---|---|---|---|---|
| 7,685,901 | B2 * | 3/2010 | Leopold et al. | ................. 74/434 |
| 2009/0072786 | A1 | 3/2009 | Lin et al. | |
| 2011/0259789 | A1 * | 10/2011 | Fan | ............................... 206/701 |

FOREIGN PATENT DOCUMENTS

| | | | |
|---|---|---|---|
| EP | 1 800 954 | A2 | 6/2007 |
| EP | 1 835 706 | A2 | 9/2007 |

* cited by examiner

*Primary Examiner* — Glenn Dayoan
*Assistant Examiner* — Melissa A Black
(74) *Attorney, Agent, or Firm* — Dickstein Shapiro LLP

(57) ABSTRACT

A support and retention assembly for a portable electronic device has a support member with a front surface which defines a rest surface. The support member is connected to a structure of a dashboard so as to able to be moved between a retracted position and an extended position, in which it is locked by means of releasable locking devices. The assembly is provided with a rest element which projects from the front surface at a lower end of the support member and a clamp which is arranged over the rest element and may rotate upwards about a horizontal axis starting from a stowed position, in which at least part of the clamp is housed in a seat made in the front surface.

19 Claims, 4 Drawing Sheets

SUPPORT AND RETENTION ASSEMBLY FOR A PORTABLE ELECTRONIC DEVICE, AND DASHBOARD PROVIDED WITH SUCH A SUPPORT AND RETENTION ASSEMBLY

BACKGROUND OF THE INVENTION

1. Field of the Invention

The present invention relates to a support and retention assembly for a portable electronic device.

2. Description of the Related Art

Portable electronic devices, such as mobile phones, GPS navigators and tablets, are relatively widespread and are also used on vehicles, in particular on commercial vehicles.

Generally, the portable electronic device is coupled to a support, which, in turn, is attached to the windscreen of the vehicle by means of a suction cap. This type of coupling, however, is subject to undesired releases and may compromise external visibility through the windscreen.

The need is thus felt to be able to integrate the support in the vehicle dashboard, so as to make the portable electronic device comfortable and simple to use, without compromising the external appearance of the dashboard itself.

At the same time, the need is felt to provide a support of the universal type, i.e. a support to which electronic devices of mutually different shape and/or size can be coupled, so as to adapt in simple manner without substantial modifications to the various needs of different users.

SUMMARY OF THE INVENTION

It is the object of the present invention to make a support and retention assembly for a portable electronic device, which allows to solve the needs illustrated above in a simple and cost-effective manner and which preferably retains the portable electronic device with a high degree of security and makes the screen of the device comfortably visible to the driver.

According to the present invention, a support and retention assembly for a portable electronic device is provided as described and claimed herein. Furthermore, according to the present invention, a vehicle dashboard is provided as described and claimed herein.

BRIEF DESCRIPTION OF THE DRAWINGS

The invention will now be described with reference to the appended drawings which illustrate a non-limitative embodiment thereof, in which.

DETAILED DESCRIPTION OF THE INVENTION

Figure 1:
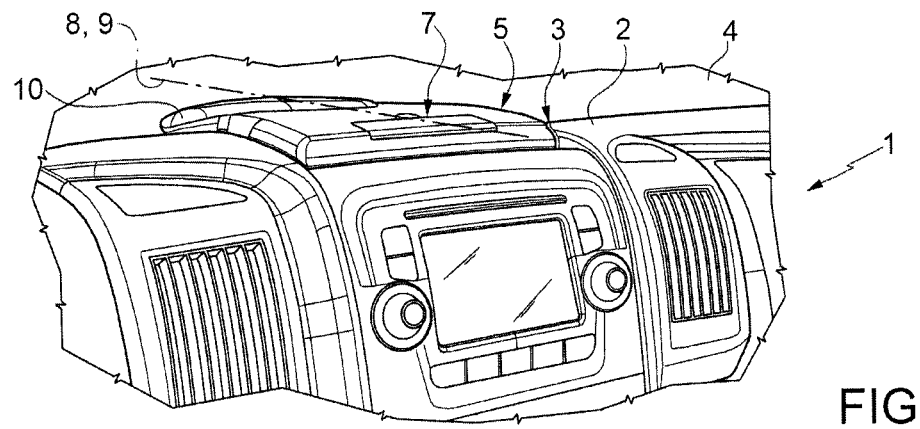
FIG. 1 is a prospective partial view of a vehicle dashboard provided with a preferred embodiment of the support and retention assembly for a portable electronic device according to the present invention, with such a support and retention assembly shown in a stowed configuration.

In FIG. 1, reference numeral 1 indicates, as a whole, a vehicle dashboard (partially shown) comprising a structure 2 made of plastic material and having an outer surface 3, which is preferably oriented upwards and thus faces a windscreen 4 of the vehicle. Furthermore, the dashboard 1 comprises a support and retention assembly 5 fixed to the structure 2 having a support member 6, which is moveable with respect to the structure 2 between a retracted position and an extended position and has a front surface 7 defining a rest surface, which is preferably elongated along a direction 8.

In the retracted position, the support member 6 is adjacent to the structure 2 and, preferably, remains at least in part concealed in the structure 2. In particular, the surface 7 remains substantially flush with the surface 3 and the direction 8 substantially coincides with the longitudinal direction of advancement 9 of the vehicle.

Figure 2:
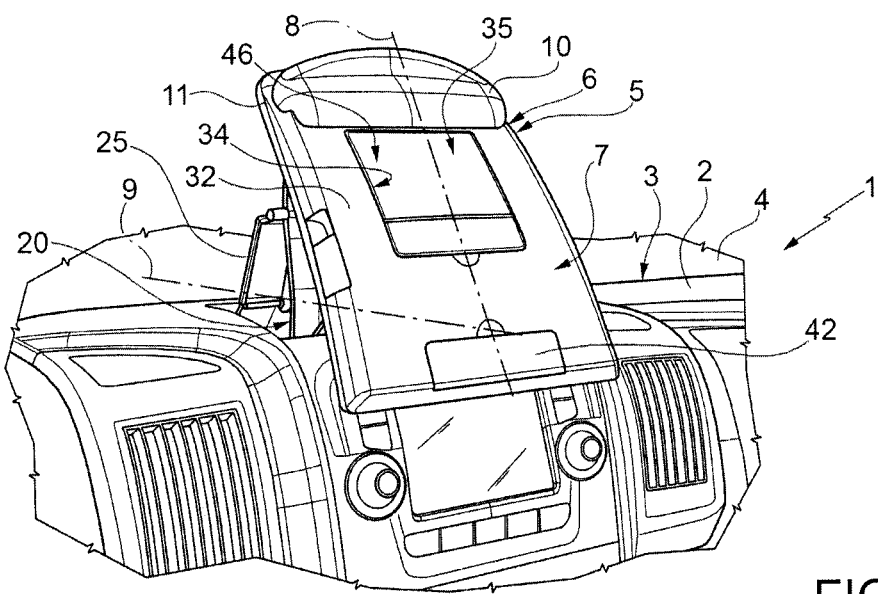
FIGS. 2 and 3 are similar to FIG. 1 and show the support and retention assembly in different operative configurations.
Figure 3:
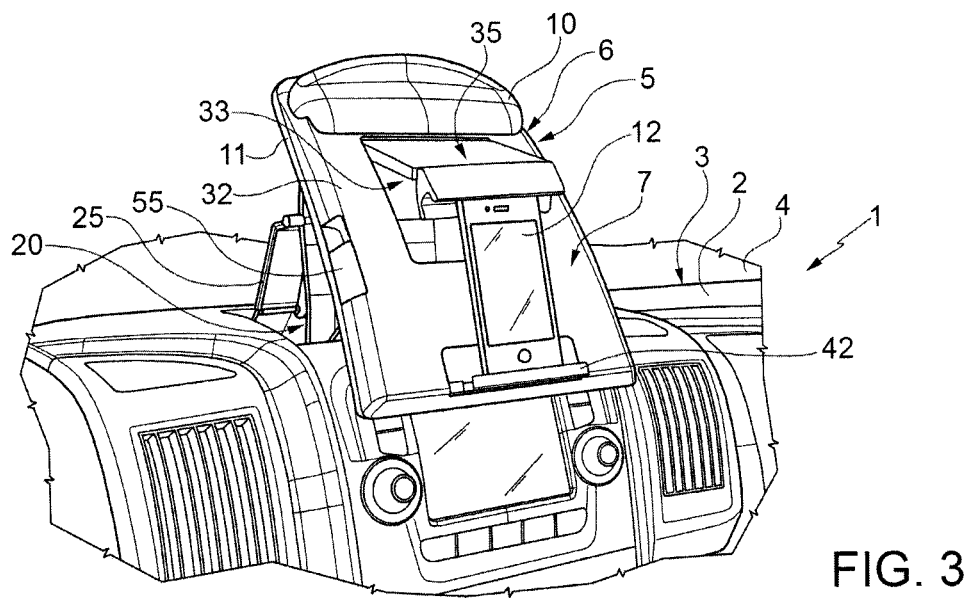

As shown in FIGS. 2 and 3, on the other hand, in the extended position the support member 6 is set apart from the structure 2, towards the center of the passenger compartment, and preferably rotates about a horizontal axis orthogonal to direction 9, with respect to the retracted position described above with reference to FIG. 1.

In the extended position, the support member 6 may be positioned in two configurations: in the first, shown in FIG. 2, it performs a stand or desk function, because one or more sheets, e.g. a note pad (not shown), can be arranged on the surface 7 and, in particular, such sheets can be held by means of a clamp 10 hinged to an upper portion 11 of the support member 6. In the second configuration, shown in FIG. 3, the support member 6 can support and retain a portable electronic device 12 and, in particular, can be adapted to devices 12 of different size, as will be described in greater detail below.

Figure 5:
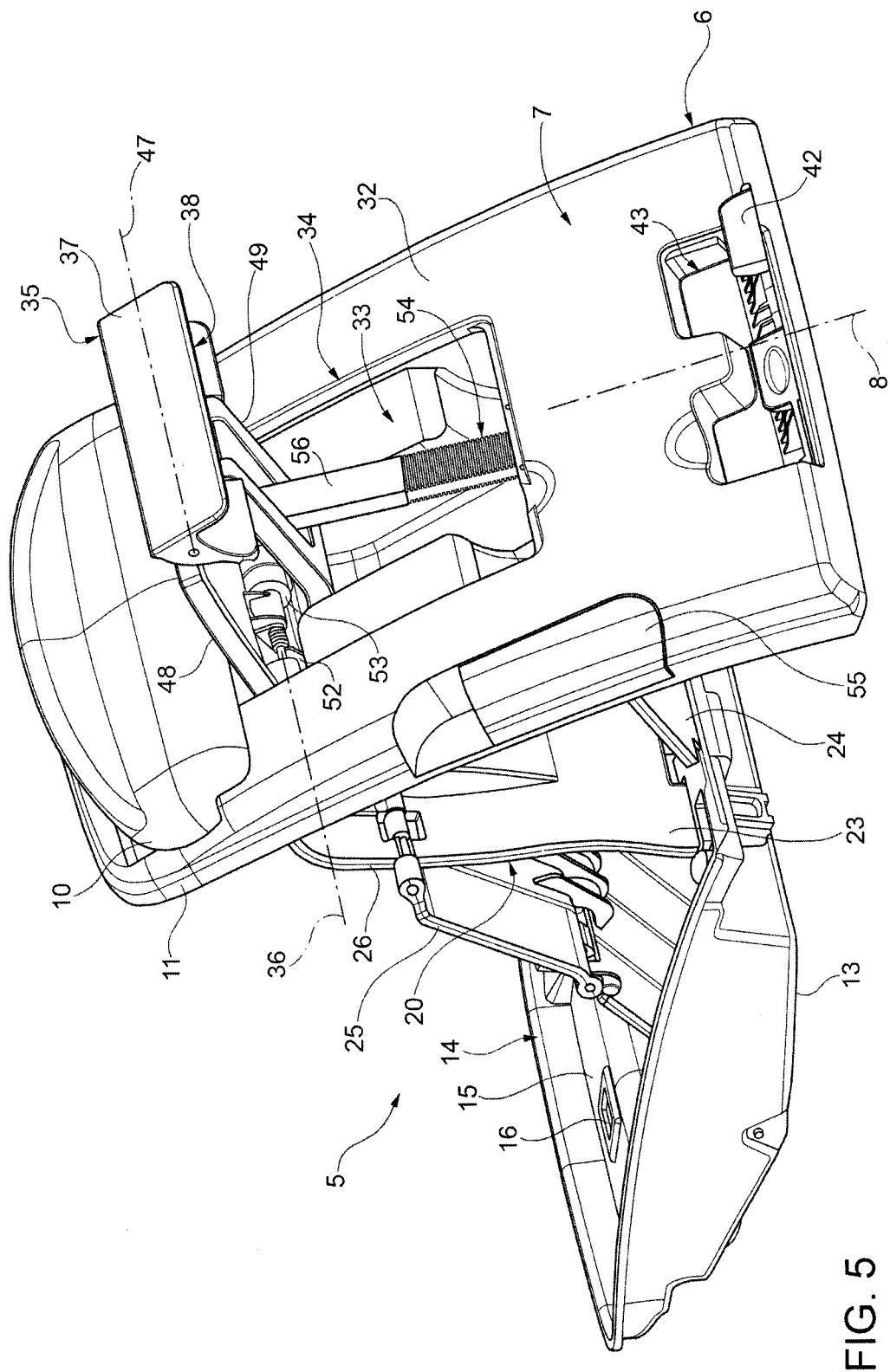
FIG. 5 is similar to FIG. 3 and shows the support and retention assembly on an enlarged scale.
Figure 6:
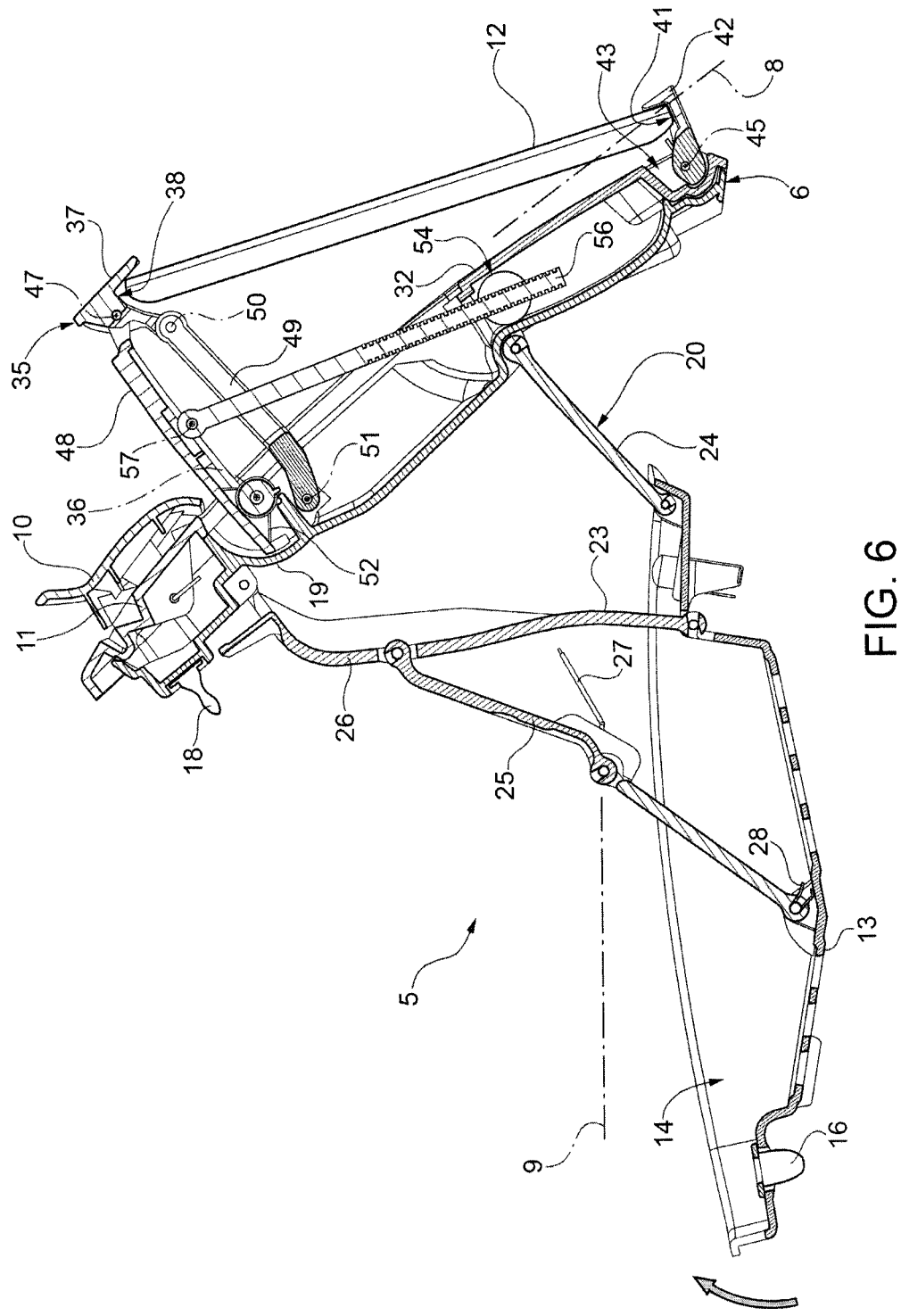
FIG. 6 shows the support and retention assembly in the configuration shown in FIG. 5 in cross-section, taken along a vertical section plane.

With reference to FIGS. 5 and 6, the assembly 5 comprises a fastening element 13, which is fixed to the structure 2, for example by means of screws, and is housed at least in part in the structure 2. The fastening element 13 is preferably constituted by a shell defining a seat 14 facing the passenger compartment of the vehicle and comprises a portion 15 which supports, in fixed position, a fastening member 16, of the type known in itself and not described in detail. The fastening member 16 is releasably engaged by a hooking element, fixed to a rear portion 19 of the support member 6 and defined, for example, by a pin 18. A retaining action is provided between the fastening member 16 and the pin 18 to keep the support member 6 in the retracted position until a manual releasing action is exerted by a user. In the particular illustrated example, the releasing action is defined by an upward manual traction on the support 6, carried out, for example, by grasping the clamp 10, which must go beyond a given threshold in order to overcome the aforesaid retaining action and release the pin 18.

Obviously, the fastening member 16 may be alternatively coupled to the support member 6, and the pin 18 may be coupled to the fastening element 13. Furthermore, devices other than the fastening member 16 and/or having different releasing methods, for example with a manually actuated control, may be provided.

In the retracted position, the support member 6 remains, at least in part, housed in the seat 14. In particular, as mentioned above, the surface 7 remains substantially flush with the surface 3.

In order to define the trajectory of the support member 6 between the retracted and extended positions, the connection system between the rear portion 19 and the fastening element 13 is advantageously defined by a four-bar linkage 20. The four-bar linkage 20 comprises two levers 23, 24 hinged, at their ends, to the rear portion 19 and to the fastening element 13 about axes which are horizontal and orthogonal to the direction 9.

Advantageously, the center distances of the levers 23,24 are different one from the other to define a rotation of the support member 6 along the extension/retraction trajectory.

As shown in FIG. 6, the assembly 5 advantageously comprises a toggle leverage 25 for locking the support member 6 in the extended position. In particular, the leverage 25 connects an intermediate portion 26 of the lever 23 to the fastening element 13, has a stable locking position, overcoming a dead point, to keep the lever 23 lifted, and comprises a releasing element 27 which must be manually actuated to set apart the leverage 25 from the stable locking position to overcome the dead point and, thus, to allow the leverage 25 to fold and lower the lever 23.

Preferably, at least one elastic element 28 is provided between the leverage 25 and the fastening element 13 for facilitating the release of the leverage starting from the retracted position, after releasing the fastening member 16. In all cases, manual actuation is needed to take the support member 6 beyond the dead point in the extended position.

Alternatively to that described above, the fastening element 13 could be absent so that the four-bar linkage 20 and leverage 25 could be coupled directly to the structure 2.

The support member 6 comprises a portion 32, which is arranged under portion 11, considering direction 8, and defines a seat 33 with an opening 34 made in the surface 7.

The assembly 6 comprises a clamp 35, which is coupled to the support member 6 so as to rotate upwards from a stowed position, about an axis 36 which is horizontal and orthogonal to the direction 8. The clamp 35 ends with a hooking element 37 having a groove 38, which is parallel to the axis 36, is open on its side ends and, when the clamp 35 is lifted, may be engaged by an upper edge of the device 12. At the same time, the lower edge of the device 12 engages a groove 41, parallel to the groove 38, also open on its side ends. The groove 38 is defined by a rest element 42 which is arranged at the lower end of the portion 32 and projects forwards with respect to surface 7. The rest element 42 is preferably defined by a disappearing element, distinct from the support member 6, i.e. it may be moved and stowed in a housing 43 of the support member 6 so as to eliminate any projection from the surface 7. For example, the housing 43 is made in the surface 7 at the lower end of the support member 6, and the rest element is hinged to such a lower end about an axis 45 parallel to axis 36.

Figure 4:
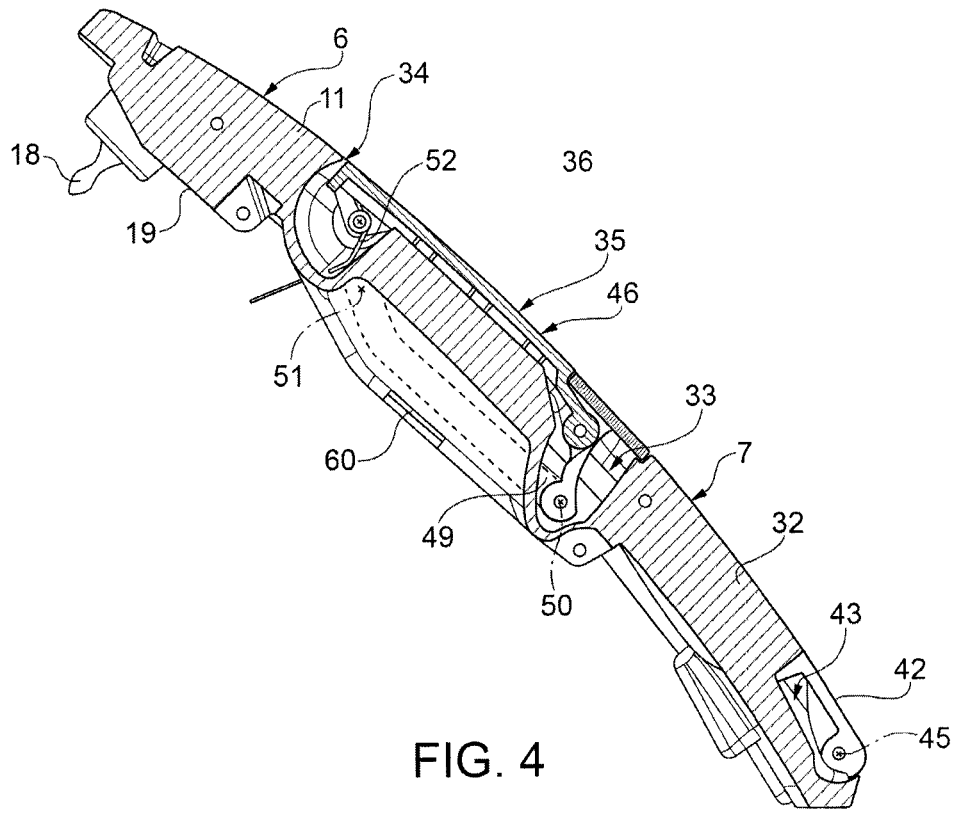
FIG. 4 is a side view on enlarged scale and with parts in cross-section, of a component of the support and retention assembly, in the configuration shown in FIG. 2.

As shown in FIG. 4, also the clamp 35 is a disappearing element, because in its stowed position it is at least in part housed in the seat 33, so as to substantially close the opening 34. In particular, the groove 38 faces inwards from the support member 6. On the other side, the clamp 35 has a surface 46 which remains substantially flush with the surface 7, so as not to compromise the desk function and the appearance of the dashboard 1.

With reference to FIG. 6, the clamp 35 advantageously comprises two pieces hinged to each other about an axis 47 parallel to axis 36. One of these pieces is defined by the hooking element 37. The other of such pieces is defined by a wall 48, hinged to the portion 32 about the axis 36. In order to constrain the movements of the two pieces to each other, the hooking element 37 is coupled to the portion 32 by means of an arm 49, which is preferably fork-shaped and remains completely housed in the seat 33 when the clamp 35 is arranged in the stowed position. The opposite ends of the arm 49 are hinged to the hooking element 37 and to the portion 32 about respective axes 50,51 parallel to, and set apart from the axes 36,47, so that the arm 49 and the wall 48 jointly define a four-bar linkage for keeping the groove 38 always facing downwards (i.e. towards the rest element 42) regardless of the lifting angle of the clamp 35 about axis 36. Indeed, the lifting of the clamp 35 with respect to the surface 7 may be carried out with a variable angle so that the user may adapt the distance between the hooking element 37 and the rest element 42 to the actual height of the device 12.

Again with reference to FIG. 5, the assembly 5 further comprises at least one preloaded elastic element 52 to push the clamp 35 towards the stowed position. For example, the elastic element 52 is defined by a flush spring arranged at the axis 36, between the clamp 35 and the portion 32. Again at the axis 36, a damping element 53 is preferably provided to decelerate the descent of the clamp 35 towards the stowed position when the device 12 is removed from the assembly 5.

Figure 7:
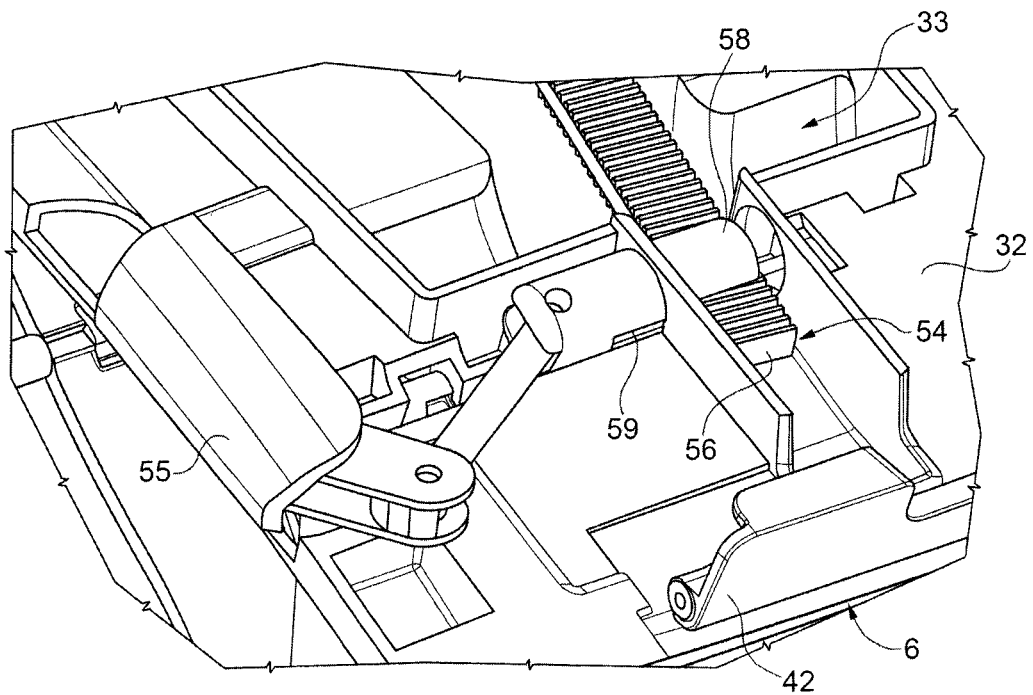
FIG. 7 is a perspective view on enlarged scale of an interior detail of the support and retention assembly shown in the figures above.

The thrust exerted by the elastic element 52 tends to pinch the device 12 between the hooking element 37 and the rest element 42, but such a thrust is not sufficient to oppose the accelerations which normally act on the device 12 during the trips of the vehicle, in particular in case of accidents. As also shown in FIG. 7, in order to solve this problem, the assembly 5 comprises a mechanical locking device 54, which can be activated by means of a manual actuating control 55, coupled to the support member 6, to prevent the clamp 35 from lifting with respect to the set angular position and, thus, stably lock the device 12 between the hooking element 37 and rest element 42. In the particular illustrated example, the device 54 comprises: a rod 56, which is hinged to an intermediate zone of the clamp 35 about an axis 57 parallel the axis 36 and extends beyond the arm 49, within the portion 32; and a slider 58, which is guided by the portion 32 in transverse direction to the rod 56 and is actuated by the control 55 so as to move between a first position, in which the rod 56 is free to move, and a second position (not shown), in which the rod 56 is locked by a portion 59 of the slider 58. In particular, the portion 59 has a notching which engages a corresponding notching of the rod 56 to obtain the locking.

Normally, the slider 58 is arranged in the first position and an intervention on the control 55 is needed for it to be moved to the second position. However, the configuration of the device 54 could be opposite, so that the slider 58 needs to be released in order to lift the clamp 35 and couple the device 12.

In the illustrated example, the control is defined by a lever hinged to the portion 32, but which could also be defined by a button or by a slider, sliding parallel to the direction 8.

Advantageously, the assembly 5 comprises an adjustment hinge 60, diagrammatically shown in FIG. 4, arranged between the rear portion 19 and the front surface 7 and such to define a rotation of the portion 32, with the front surface 7, the clamp 35 and the rest element 42, so as to be able to orient the device 12 rightwards or leftwards about an axis which, for example, is substantially vertical or parallel to the direction 8. The adjustment hinge 60 could consists of an articulated joint, which makes the device 12 free to rotate also slightly downwards and upwards.

As mentioned above, in order to use the assembly 5 the user (the driver or the passenger of the vehicle) must firstly move the support member 6 into the extended position in which the support member 6 remains automatically by effect of the leverage 25. At this point, the user may use the surface 7 as a rest for sheets of paper or may couple the device 12. To obtain this second function, the user must firstly extract the rest element 42 from the housing 43 and, while resting the lower edge of the device 12 in the groove 41, and must lift the clamp 35 from the seat 33 by an angle sufficient to insert the upper edge of the device 12 in the groove 38. The elastic element 52 momentarily maintains the clamp 35 against the device 12, while awaiting for the device 54 to be manually activated by means of the control 55.

Similarly, to remove the device 12 from the assembly 5, it is necessary to deactivate the device 54 and then lift the clamp 35 slightly to release the upper edge of the device 12 from the groove 38. After having left the clamp 35, the latter automatically returns to its stowed position, within the seat 33. The rest element 42 may be left in its projecting position, for example to support the lower edge of the sheets resting on the surface 7, or may be rotated upwards and stowed back in the housing 43.

From the above, it is apparent that the assembly 5 is perfectly integrated in the components of the dashboard 1 by virtue of the fact that it houses at least part of the support member 6 in the dashboard 1 and that it houses at least part of the clamp 35 in the support member 6. In particular, the assembly 5 can perform different functions, i.e. a supporting function of sheets or note pads, and a supporting function of the device 12. At the same time, the rotation clamp 35 allows to adapt the assembly 5 to devices 12 of different heights.

The specific features of the clamp 35 and the rest element 42, and the presence of the device 54, even individually, contribute to making the retention of the device 12 stable and safe.

It is finally apparent that the coupling and uncoupling operations of the device 12 are extremely simple.

The assembly 5 is relatively light and has a relatively low number of components but is in all cases designed so as to have a high resistance to shocks and/or shaking. Furthermore, its dimensions are extremely reduced with respect to the known solutions, especially when the support member 6 is retracted and concealed in the dashboard 1, the functions performed by the assembly 5 being equal.

The fastening element 13 allows to have an assembly 5 which may be coupled to the remaining part of the dashboard 1 either as optional equipment or as modular element. For example, if this optional equipment is not installed, it could be easily replaced by a simple covering wall or by another device during the assembly of the dashboard 1.

Finally, it is apparent from the above that changes and variations may be made to the described assembly 5 without departing from the scope of protection of the present invention.

In particular, the support member 6 could be coupled to the remaining part of the dashboard 1 by means of connection devices and locking devices different from the four-bar linkage 20 and leverage 25.

Similarly, also the device 54 could be different, for example it could be associated to the hinge which connects the wall 48 to the portion 32.

Furthermore, the clamp 10 could be absent or replaced by another retaining element to hold the sheets, an example a magnetic retention element.

The rest element 42 could be simply defined by an appendix fixed with respect to the support member 6, possibly with a different shape from that shown, but anyway to be able to rest the lower edge of the sheets and the lower edge of the device 12. Similarly, the hooking element 37 may be fixed with respect to wall 48 and have a different shape from the one shown.

What is claimed is:

1. A support and retention assembly for securing a portable electronic device to a dashboard of a vehicle, the assembly comprising:

a support member having a front surface, which defines a rest surface, the support member being pivotably connected to and movable with respect to the dashboard;

connecting means to connect said support member to a structure of the dashboard and move said support member between a retracted position and an extended position with respect to the dashboard;

first releasable locking means to keep said support member in the retracted and extended positions;

a rest element, which is coupled to an end of said support member and projects with respect to said front surface, in at least one operational configuration;

a clamp directly coupled to said support member so as to be movable together with the support member between the retracted and extended positions of the support member, the clamp being arranged above said rest element when said support member is arranged in the extended position;

said clamp being upwardly rotatable about a first horizontal axis with respect to the support member when the support member is in the extended position, said clamp being rotatable from a stowed position, in which at least part of said clamp is housed in a first seat provided in said front surface, to a deployed position, in which said clamp secures the portable electronic device to the assembly.

2. The assembly according to claim 1, characterized in that, in said stowed position, said clamp is substantially flush with said front surface.

3. The assembly according to claim 1, characterized in that said clamp comprises two pieces hinged to each other about a second horizontal axis parallel to said first horizontal axis.

4. The assembly according to claim 3, characterized in that one of said piece constitutes part of a first four-bar linkage, which connects the other one of said piece to said support member.

5. The assembly according to claim 1, characterized in that, at one end, said clamp comprises a hooking element having a groove, which is parallel to said first horizontal axis and faces said rest element.

6. The assembly according to claim 5, characterized in that said clamp comprises a wall hinged to said support member about said first horizontal axis; said hooking element being hinged to said wall about a second horizontal axis parallel to, and set apart from, said first horizontal axis.

7. The assembly according to claim 6, characterized by comprising an arm, the opposite ends of which are hinged to said hooking element and to said support member about respective axes, that are parallel to, and set apart from, said first and second horizontal axes.

8. The assembly according to claim 1, characterized in that said rest element is movable with respect to said support member so that it can be stowed in a housing provided in said support member.

9. The assembly according to claim 1, characterized by further comprising second releasable locking means able to prevent said clamp from rotating upwards beyond a desired angular position about said first horizontal axis.

10. The assembly according to claim 9, characterized by comprising manually operated control means to activate/release said second locking means.

11. The assembly according to claim 1, characterized by comprising elastic means arranged between said clamp and said support member and preloaded so as to push said clamp towards the stowed position.

12. The assembly according to claim 11, characterized by comprising damping means arranged between said clamp and said support member to slow the rotation of said clamp towards its stowed position.

13. The assembly according to claim 1, characterized in that said first locking means comprise a toggle leverage to secure said support member in the extended position.

14. The assembly according to claim 1, characterized in that said connecting means comprises a second four-bar linkage.

15. The assembly according to claim 14, characterized in that said connecting means comprise a fastening element suitable for being fastened to said structure and defining a second seat; when arranged in the retracted position, said support member being housed, at least in part, in said second seat.

16. The assembly according to claim 15, characterized in that said first locking means comprises a fastening member supported in a fixed position by said fastening element.

17. The assembly according to claim 1, characterized in that said support member comprises a rear portion connected to said connecting means and a hinge or an articulated joint arranged between said rear portion and said front surface to allow rotation of said portable electronic device.

18. A vehicle dashboard comprising a structure and a support and retention assembly for a portable electronic device, characterized in that said assembly is provided according to claim 1.

19. The dashboard according to claim 18, characterized in that, when said support member is positioned in the retracted position, said support member is, at least in part, housed within said structure.

* * * * *